C. TRIBBY.
Watchmakers' Lathe.
No. 31,340.
Patented Feb. 5, 1861.
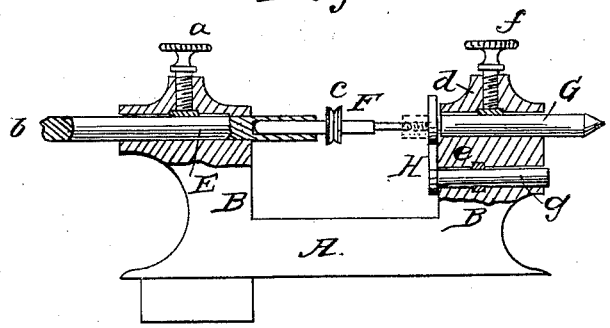
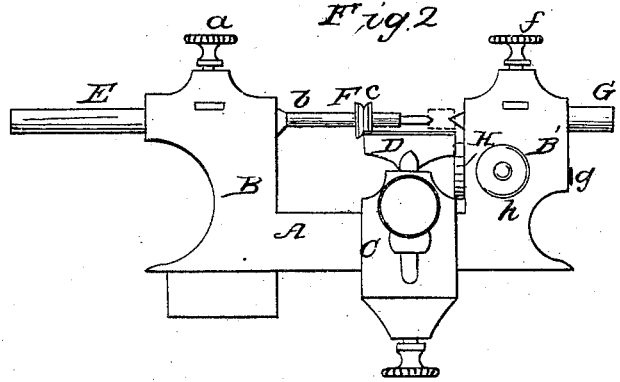
Witnesses
J. W. Coombs
R. S. Spencer
Inventor
Chas Tribby
per Munn & Co.

UNITED STATES PATENT OFFICE.

CHARLES TRIBBY, OF WINCHESTER, VIRGINIA.

WATCHMAKER'S LATHE.

Specification of Letters Patent No. 31,340, dated February 5, 1861.

*To all whom it may concern:*

Be it known that I, CHARLES TRIBBY, of Winchester, in the county of Frederick and State of Virginia, have invented a new and Improved Watchmaker's Lathe; and I do hereby declare that the following is a full, clear, and exact description of the same, reference being had to the accompanying drawing, forming a part of this specification, in which—

Figure 1, represents a sectional side elevation of my invention, when arranged for fastening a stone on the center. Fig. 2, is a side elevation of the same, when arranged for turning the stone.

Similar letters of reference in both views indicate corresponding parts.

The object of this invention is to facilitate the turning of such stones, which are generally used for jeweling watches. The frame plates and other parts of watches are perforated by the watch finisher or escapement maker for the watch jeweler, whose business it is to fit into the holes thus made certain hard stones such as rubies, sapphires, chrysolites, and, in some cases, diamonds, so perforated that the pivots of the watch movement may work in them. The grinding, polishing, turning and drilling of these stones is performed on a lathe the spindle of which receives a very rapid rotary motion. For the purpose of turning, the stones are generally fastened to a chuck by means of cement, and whenever during the operation of turning it is desired to measure the stone by holding it up to the plate, it is necessary to take off, and refasten it to the chuck if the turning has to be continued. The loss of time created by the labor of taking off and refastening the stones and the uncertainty attending the whole operation is obviated by my invention, which I will now proceed to describe with reference to the drawing.

The stock A, of my lathe is provided with two heads B, B′, and between these heads is the slide C, which forms the support for the rest D.

The head B, is perforated in a direction parallel to the stock and it is provided with a mandrel E, that slides in said head in a longitudinal direction being retained in the desired position by a set screw $a$; the end of this mandrel is provided with a hollow center $b$, and the other end is drilled in a longitudinal direction to receive the lathe spindle F. This spindle is provided with two points, and a little pulley $c$, serves to impart to the same the desired rotary motion in the usual manner.

The head B′, is perforated with two holes $d$, $e$, the hole $d$, which is in line with the mandrel E, to receive the center G, which is secured in the desired position by a set screw $f$; and the hole $e$ to receive the stem $g$, of a bed or plate H, which turns on said stem and which is secured in the desired position by a set screw $h$. When this plate is turned up in a vertical position, it covers the hole $d$, and its face is so adjusted that it forms a plane at right angles with the center line of the mandrel E.

The operation is as follows: The stone to be turned is placed flat on the bed H, and the point of the double centered spindle F, is brought to bear on its pivot hole as clearly shown in Fig. 1 of the drawing. In this position the stone is fastened on the point of the spindle by spreading a good cement over it by means of a spirit lamp and blow pipe allowing it to settle on the jewel and then to cool. After the cement is perfectly cold the spindle F, is withdrawn from the mandrel E, the bed H, is turned down from before the hole $d$, and the mandrel E, is reversed so that one point of the spindle can be inserted into the hollow center $b$. The center G is now brought to bear on the pivot hole of the stone and after both the mandrel and the center G, have been fastened by means of the set screws $a$, and $f$, the stone is ready for turning. By these means the stone is securely fastened between two points and if the face of the bed H, is perfectly true, the stone cannot help to be in the correct position and it can now be turned and fitted to the hole in the plate of the watch without being compelled to loosen and refasten it for the purpose of measuring, it being very easy, to take out the spindle with the stone, whenever it is desired to hold it up to the hole in the plate.

The advantage of this device, particularly for repairing watches, will be appreciated by every practical watchmaker.

Having thus fully described my invention what I claim as new and desire to secure by Letters Patent, is,

The arrangement of the movable bed H, in combination with the mandrel E, drilled on one end and provided with a hollow center $b$, on the other end and with the double centered spindle F, all constructed and operating in the manner and for the purpose herein described.

CHARLES TRIBBY.

Witnesses:
 H. Z. RHOADS,
 THEODORE YOUNG.